Nov. 8, 1966    E. GÖTZ ET AL    3,284,618
NOMINAL VALUE POSITION CONTROL SYSTEM
Filed March 16, 1962    3 Sheets-Sheet 1
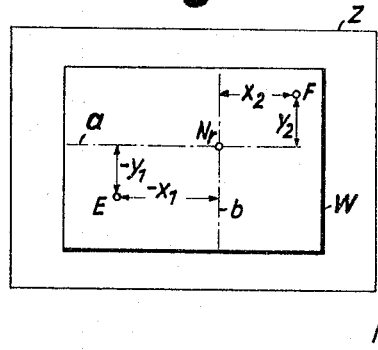
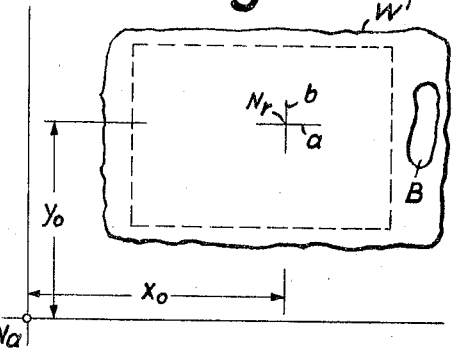
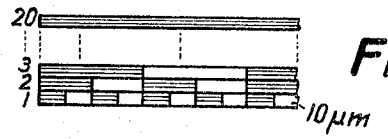
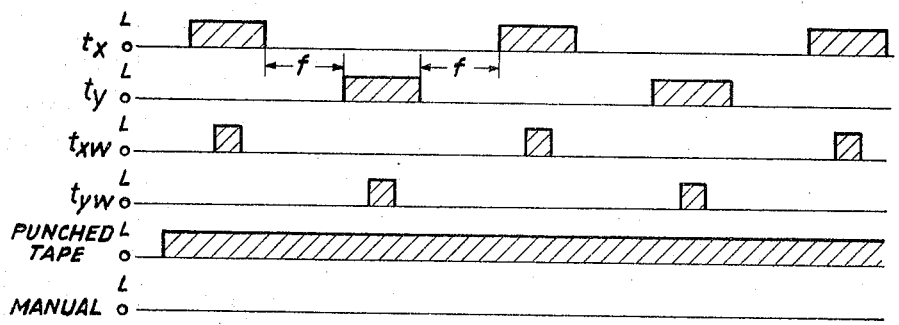
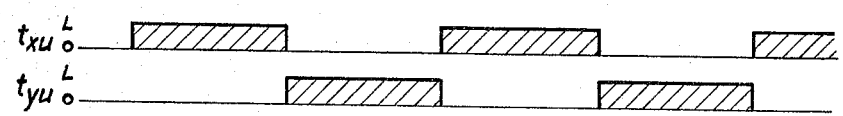
Elmar Götz
Peter Boese
Inventors
By: George H. Spencer
Attorney

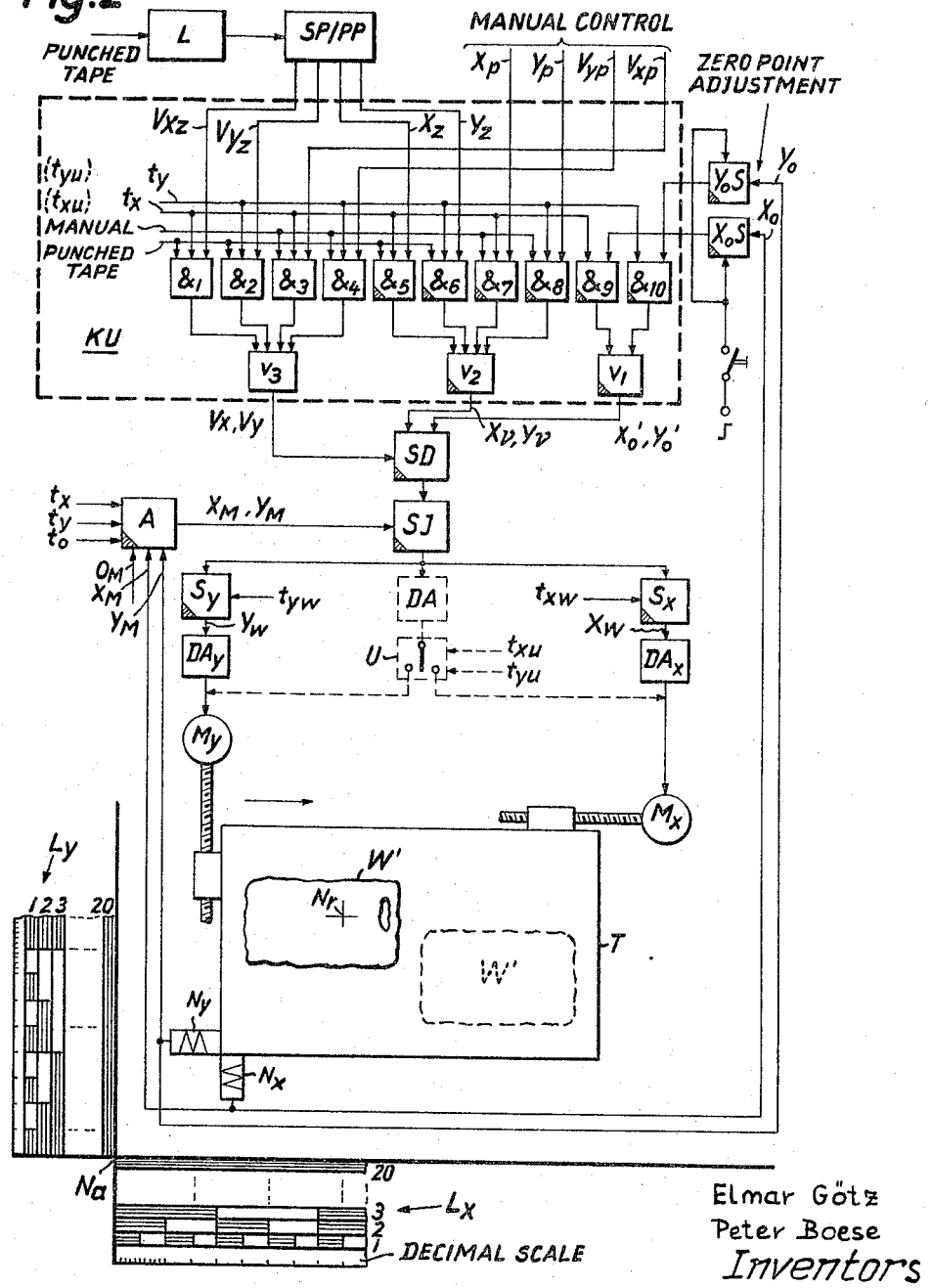

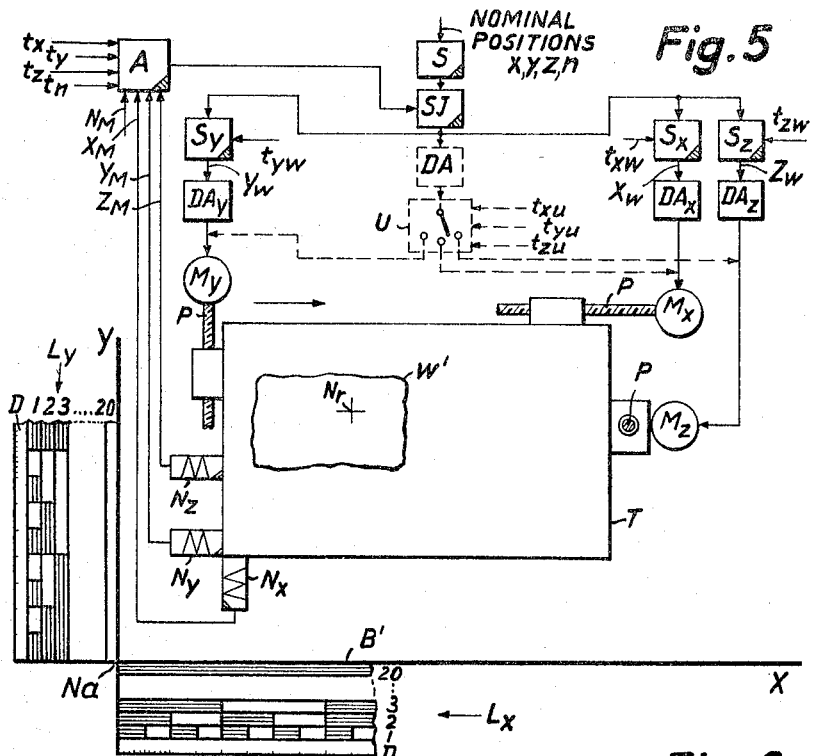
Fig. 5
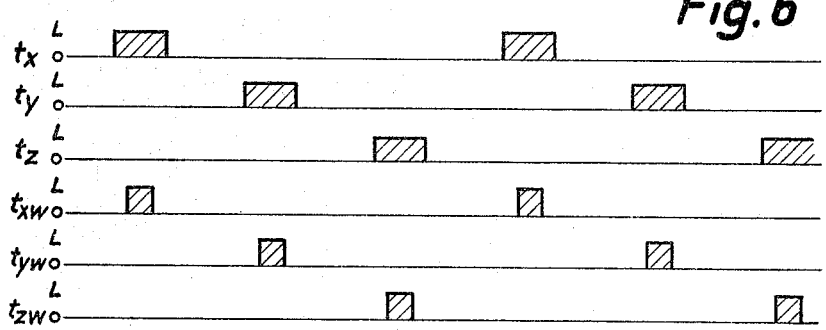
Fig. 6
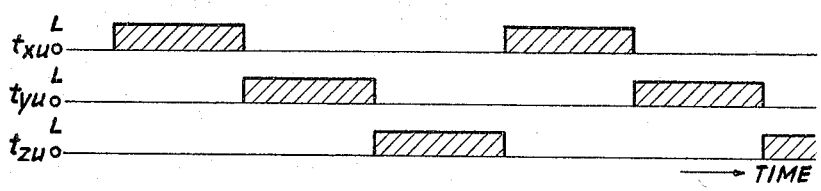

United States Patent Office 3,284,618
Patented Nov. 8, 1966

3,284,618
NOMINAL VALUE POSITION CONTROL SYSTEM
Elmar Götz and Peter Boese, both of Berlin-Frohnau, Germany, assignors to Licentia Patent-Verwaltungs-G.m.b.H., Frankfurt am Main, Germany
Filed Mar. 16, 1962, Ser. No. 180,259
Claims priority, application Germany, Mar. 22, 1961, L 38,512, L 38,513
21 Claims. (Cl. 235—151.11)

The present invention relates to a control system.

There exist control systems for numerically controlling various types of machinery, such as work tools, in which a controlled positioning is provided. The instantaneous actual position is measured with a suitable measuring system and is compared with the intended or desired position, hereinafter referred to as the desired or nominal position, as given by the programming of the system. A signal derived from the deviation of the actual position from the nominal position causes an appropriate displacement of the movable element of the work tool so as to bring it from the particular position it occupies to the proper position which the element is supposed to occupy. Such control systems can be used where the actual work element of the machine is to be placed at a given point, as, for example, the drill of a drilling machine, the cutting element of a planer or shaper, the electrode of a spot welder, the dies of a punching machine, and so on. Thus, if the machine is a coordinate-type drill, the system is simply given the $x$ and $y$ coordinates of the point at which the hole is to be drilled, whereupon the drill will be moved to this point and drill the hole in the work piece at the intended point.

The basic concept underlying the present invention involves the use of the absolute zero point, hereinafter referred to as the "origin," of the machine tool. The use of the "absolute zero" coordinate system has the very substantial advantage over conventional relative coordinate systems that, in the case of faults, as, for instance, power failure, the position of the zero point always remains unchanged and thus will be readily available for reference purposes once the fault has been removed. In contradistinction thereto, the relative coordinate system carries out a counting operation, such as by means of an electronic storage register, which, upon the occurrence of a fault, is cleared so that, once the fault has been removed, there is no way of determining how far the counter has progressed. It is, therefore, necessary to start the count anew.

In large machine tools, it is essential that the work pieces, which themselves are often large and of unwieldy shape, be mounted on the work spindles or tables without consideration of where the actual zero point of the machine is, this zero point being the reference of the measuring system. Another requirement is that engineering or shop drawings of the piece which are needed for determining how the piece is to be worked should also be usable for setting up the machine, and it is therefore a further object of the present invention to make this possible. Accordingly, the present invention is based on a measuring system in which the measurement of the predetermined operating points is with reference to points or axes of symmetry. The machine is then set or positioned with reference to these points or axes of symmetry. The points or axes of symmetry may be scratch marks on the work piece to be worked.

There exist work pieces which have to be worked in such a manner as to take into consideration more than two coordinates. The movable machine element which carries the work piece to be worked, for example, a support table, should thus be adjustable in more than two mutually perpendicular directions. Furthermore, it is often necessary that the work piece be pivotable from one particular position into other particular positions, for instance, in order to allow mutually inclined holes to be drilled into the work piece. It is not uncommon that there be over five changes of positions between work piece and work tool, into all of which positions the parts should move automatically. Work pieces which require such relatively difficult working will need a complete control system for each coordinate and other changes of position, so that a substantial amount of complicated and expensive equipment is required. Another object of the present invention, therefore, is to reduce this amount of equipment.

With the above objects in view, the present invention resides in a numerical control system, particularly for machine tools, which system incorporates a position control circuit. Basically, the invention resides in that the nominal position for the control circuit is derived from the position of the absolute zero point or origin of the machine tool and from the position of the particular operating point. In order to make it possible for the work piece to be mounted at any desired place, and also in order to make it possible for shop drawings to be used, which shop drawings have no actual reference to the machine tool but which are used as a starting point when the operating or working point is measured with respect to points or axes of symmetry, it is another feature of the present invention to form the nominal position for the control circuit as a digital value derived from the position of the origin of the machine tool, the position of the points or axes of symmetry, the position of the operating point at which the work piece is to be worked, and the algebraic sign pertaining to the operating point with respect to the points or axes of symmetry. In order to reduce the amount of equipment required in case there are many coordinates and possibly other changes of position, the arrangement is such that the control circuit is cyclically and temporarily connected to be effective with each coordinate and other changes of position.

According to yet another feature of the instant invention, there is one comparison member for comparing the actual and nominal values, which comparison member is common to all coordinates and position changes, whereas each coordinate and position change has a separate measuring system and drive motor.

As stated above, it often happens that the work piece has to be worked in more than two coordinates so that the machine support table, or other movable element which carries the work piece, will then have to be adjustable in more than two mutually perpendicular directions, and that the work piece be pivoted into different operating positions. Here, too, the expense of the total equipment required is reduced, according to the present invention, by using a single nominal value/actual value comparison member.

Additional objects and advantages of the present invention will become apparent upon consideration of the following description when taken in conjunction with the accompanying drawings in which:

FIGURE 1a represents a shop or working drawing of a work piece.

FIGURE 1b shows the relationship between the work piece or blank and the machine tool.

FIGURE 2 is a schematic circuit diagram showing a control system according to the present invention.

FIGURE 3 illustrates a detail.

FIGURE 4 shows the time relationship of clock pulse trains applied during the operation of the system shown in FIGURE 2.

FIGURE 5 is a schematic circuit diagram showing a modification of the control system shown in FIGURE 2.

FIGURE 6 shows the time relationship of clock pulse trains applied during the operation of the system shown in FIGURE 5.

Referring now to the drawings, FIGURE 1a shows a working or shop drawing Z illustrating a blank or work piece W to be worked. This work piece is to be drilled at points E and F whose positions are given with respect to axes of symmetry $a$ and $b$ whose intersection is the point of symmetry $N^r$. FIGURE 1b shows the actual work piece W' which is mounted, in any suitable manner, on the drilling machine. This work piece W' is to have holes drilled into it which are located at points corresponding to points E and F shown in FIGURE 1a. FIGURE 1b also shows the work piece W' as having a cavity or fault B. After the work piece has been finished, it is to have the contours shown in the drawing Z of FIGURE 1a, and is shown by the dashed outline in FIGURE 1b, it thus being apparent that the fault-free portion of the work piece is large enough to make it possible to obtain the desired end product. Within this fault-free portion, the work piece is provided with scratch marks $a$, $b$, corresponding to the axes $a$, $b$, of FIGURE 1a. The origin of the drilling machine is represented by the point $N_a$, this point lying outside of the work piece W'. This origin, or absolute zero point, is permanently fixed with respect to the machine and never changes its position.

The work piece W' can be provided with bores at points corresponding to points E and F of FIGURE 1a by supplying the distances $X_o$ and $Y_o$ from the origin $N_a$ to the zero point $N_r$. These distances, however, are measurements which do not appear in the drawing Z of FIGURE 1a. Consequently, the distances taken with respect to $N_r$ would, but for the present invention, first have to be converted so as to be distances with respect to $N_a$, since it is not possible to make direct use of the measurements appearing on the drawing, which first have to be converted to fit the machine.

It is the above-mentioned conversion which is eliminated by the present invention, in that only the measurements appearing on the drawing Z ($-x_1$, $-y_1$, $x_2$, $y_2$) are used. No other data given by the designer are necessary for controlling the machine tool. Such an arrangement is shown in FIGURE 2 in which a single control system is used for a plurality of coordinates. Only the work supporting table T of the machine tool is shown, this table T being displaceable in the $x$ and $y$ directions by means of spindles driven by drive motors $M_x$, $M_y$. The work piece W' is firmly mounted on the table T, the precise location of the work piece on the table being immaterial. Thus, the work piece may be located as shown in solid lines, or it can be located as shown in dashed lines. The work piece has the scratch marks $a$, $b$, thereby fixing the zero point of the work piece $N_r$. Since, as stated above, it is immaterial where on the table T the work piece W' is located, the point $N_r$ can likewise be at any point on the table T. This work piece zero point $N_r$ is next referenced with respect to the origin $N_a$ of the machine tool, as is done in FIGURE 1b, by considering the distances $X_o$, $Y_o$. The referencing is done, for instance, by means of photoelectric scanning devices $N_x$, $N_y$, which are slidably arranged for movement along coded ruler-like measuring scales $L_x$, $L_y$. The scales are suitably fixed to the machine frame, and have their starting point or zero point coincide with the machine origin $N_a$. There appears at the output of the photoelectric scanning devices a digital value which is one of the factors from which the nominal position is derived.

FIGURE 3 shows the construction of the scales $L_x$, $L_y$, in greater detail. In the illustrated example, there are twenty strips or tracks which are to be scanned photoelectrically. In the finest (as opposed to coarsest) track 1 there are alternating opaque and translucent portions each 10 $\mu$m. long. In the next finest track 2, each opaque portion overlaps one opaque and one translucent portion of track 1, and each translucent portion of track 2 likewise overlaps one opaque and one translucent portion of the track 1. The next track similarly has opaque and translucent portions, each of which overlaps one opaque and one translucent portion of track 2, and so on. If the scales are 10 m. long and if the resolution is 10 $\mu$m., then the photoelectric devices $N_x$, $N_y$, scanning the scales will produce a digital number having a width of 20 bits. In addition to the digital raster, the scales $L_x$, $L_y$, can also be provided with normal numbers which can be read visually.

The distances $X_o$, $Y_o$, shown in FIGURE 1b can be set into the system of FIGURE 2 as follows. Assuming the machine tool to be a drill having a stationary boring tool or bit, the point $N_r$ marked on the work piece is placed in alignment with the bit by moving the table T. This adjustment need generally not be too precise because the blank normally has over-all outside dimensions larger than those of the finished work piece, as shown in FIGURE 1b. In this way, the scanning devices, $N_x$, $N_y$, which are fixedly secured to the table T, are likewise moved with respect to the scales $L_x$, $L_y$. There will thus appear signals at the outputs of the scanning devices $N_x$, $N_y$, which are proportional to the distances $X_o$, $Y_o$ (FIGURE 1b). These electric values are stored as $X_o$, $Y_o$, in storage registers $X_oS$, $Y_oS$ (FIGURE 2, "Zero Point Adjustment"). After these values have been put into the two storage registers, the same are blocked, as shown by the switch. The thus-stored values are then available at the output of the two storage registers.

The above-described adjust occurs but once, namely, at the beginning of the operation, and the values stored in the registers remain available, even if the photoelectric scanning devices $N_x$, $N_y$, are thereafter displaced. It can thus be said that the zero point $N_r$ of the blank has been referenced to the origin $N_a$ of the machine tool. Once this has been done, the blank can be worked upon.

The scanning devices $N_x$, $N_y$, are connected with a logic circuit A whose output is connected with an input of the comparison circuit SJ which compares the actual and nominal positions. As indicated by $t_x$, $t_y$, representing clock pulses, logic circuit A is a controlled circuit.

The distance measurements $x_1$, $y_1$, $x_2$, $y_2$, shown in FIGURE 1a, together with their algebraic + and − signs, are fed into a programming unit (not shown). This programming unit feeds the coded measurements, together with the algebraic signs, onto a record carrier, such as punched tape. As shown schematically in FIGURE 2, the tape passes through a punched tape reader L to which a series-to-parallel converter SP/PP is connected at whose output there appear the measurements, shown in the drawing Z of FIGURE 1a, as $X_z$, $Y_z$, in digital parallel form. The algebraic signs of these measurements also appear as $V_{Yz}$ and $V_{Xz}$, in digital form, at the output of the converter. The output values of the converter SP/PP and of the zero point storage registers $X_oS$, $Y_oS$ are applied to a coordinate conversion device KU. The measured values $X_o$, $Y_o$, which were fed into the control system during the above-described zero point adjustment are applied, via the registers $X_oS$, $Y_oS$, to the inputs of AND circuits $\&_9$, $\&_{10}$. The values $X_z$, $Y_z$, corresponding to the drawing are applied to the inputs of AND circuits $\&_5$, $\&_6$. The values $V_{Yz}$, $V_{Xz}$, derived from the algebraic signs of the measurements on the drawing Z are applied to the inputs of AND circuits $\&_1$, $\&_2$. The AND circuits $\&_1$, $\&_2$, $\&_5$, $\&_6$, will, during automatic operation, have a signal "Punched Tape" $=L$ applied to them. A clock pulse $t_x=L$ is cyclically applied to the middle inputs of AND circuits $\&_1$, $\&_5$, and to the remaining input of AND circuit $\&_9$, and a clock pulse $t_y = L$ is cyclically applied to the middle inputs of AND circuits $\&_2$, $\&_6$, and to the remaining input of AND circuit $\&_{10}$. The timing of these clock pulses $t_x$, $t_y$, which are mutually spaced apart, is shown in FIGURE 4. If the signal "Punched Tape" $= L$ and the signal $t_x = L$, then the digital values $V_{xz}$, $X_z$, $X_o$, which are applied to the AND circuits $\&_1$, $\&_5$, $\&_9$, are passed on to the inputs of OR circuits $v_1$, $v_2$, $v_3$. These digital values are indicated as $X_o'$, $X_\nu$, $V_x$, at the outputs of the OR circuits, which values are then applied to an adder/subtractor (sum difference) circuit SD. If instead of a signal $t_x=L$ there is a signal $t_y=L$, then the digital values $V_{yz}$, $V_z$, $Y_o$, which are applied to the AND circuits $\&_2$, $\&_6$, $\&_{10}$, are passed on to the OR circuits $v_1$, $v_2$, $v_3$, at whose outputs they appear as digital values $Y_o'$, $Y_\nu$, $V_y$.

As indicated above, the particular algebraic sign of the measurements in drawing Z of FIGURE 1a is applied via AND circuits $\&_1$, $\&_2$. These algebraic signs, which will have to be either positive or negative, are converted into corresponding commands L or 0. The OR circuit $v_3$ has therefore a width of but 1 bit. The adder/subtractor circuit SD is so arranged that it will either add or subtract the values coming from OR circuits $v_1$ and $v_2$, depending on the command emanating from OR circuit $v_3$. If, for example, the algebraic sign is such as to produce a command signal $=0$, then the circuit SD will add the other two values; if the command signal $=L$, then the difference is formed. The sum or difference thus obtained from the addition or subtraction of the values $X_o'$, $X_\nu$, $Y_o'$, $Y_\nu$, appears as a digital nominal value at the output of the adder/subtractor SD. If, for instance the algebraic sign command signal $V_x=0$ then the adder/subtractor SD will add to the value $X_o'$ the value $X_\nu$, so that the output of the adder/subtractor circuit will be equal to $X_o' + X_\nu$.

As set forth above, the AND circuit A is likewise controlled; this occurs in synchronism with the clock pulses $t_x$, $t_y$. If $t_x=L$, then the $X_M$ appearing at the input of circuit A is passed on. After the one-time zero point adjustment involving the storage registers $X_oS$, $Y_oS$, the value $X_M$ will coincide with the value $X_o$ of the scanning device $N_x$. The adder/subtractor will operate as an adder insofar as the point E is concerned, and as a subtractor insofar as the point F is concerned.

The digital values appearing at the output of the adder/subtractor SD and at the output of the circuit A at the instants of clock pulses $t_x$ or $t_y$ are applied to the two inputs of the comparison circuit SJ. A deviation of the actual value from the nominal value will then produce a digital value at the output of circuit SJ, which value is applied to the inputs of storage register $S_x$, $S_y$, which are adapted to be subjected to the clock pulse trains, namely, clock pulses in the form of command signals $t_{xw}$, $t_{yw}$, which, as shown in FIGURE 4, are synchronized with clock pulses $t_x$, $t_y$. For instance, the storage command signal $t_{xw} = L$ arrives after the clock pulse $t_x$ has already come into being. The output signal from circuit SJ is then taken over by the storage register $S_x$ and appears at the output thereof as the deviation $X_w$. This digital output value $X_w$ of the storage register $S_x$ remains even when the storage command signal $t_{xw} = L$ disappears.

The value $X_w$ is transferred when the next storage command $t_{xw}$ appears. This value $X_w$ is applied to a conventional digital analog converter $DA_x$, which converts this digital value into an analog voltage; the latter controls the positioning motor $M_x$ which moves the table T along the $x$ coordinate. When it is the position of point E (FIGURE 1a) which is to be attained, the displacement along the $x$ coordinate will occur in the direction shown by the arrow and will equal the distance $-x_1$.

Similarly, the digital values pertaining to the $y$ coordinate, namely, the values $Y_o$, $Y_z$, $V_{yz}$, applied to the storage register $Y_oS$ and the converter $SP/PP$ will be processed upon the occurrence of clock pulses $t_y$, $t_{yw} = L$.

In the OR circuits $v_1$, $v_2$, the black triangles signify that a plurality of bits are fed into these stages, corresponding to the number of digits of the zero points and the measuring values $V_o$, $Y_o$; $X_z$, $Y_z$, applied to the corresponding AND circuits. For the sake of simplicity, the inputs for but one bit are shown for each of the OR circuits $v_1$, $v_2$.

As is apparent from the above description of FIGURE 2, taken in conjunction with FIGURE 4, the control of the coordinates $x$ and $y$ occurs alternately, i.e., in a staggered manner in that first the $x$ coordinate is controlled, then the $y$ coordinate, then again the $x$ coordinate, and so on. The rate at which this occurs can be so fast that the positioning motors $M_x$, $M_y$, will not react to the fact that they are not, strictly speaking, being controlled continuously, but only during discrete spaced-apart time intervals. It is evident, therefore, that the arrangement shown in FIGURE 2 is not limited to control along two coordinates, but can be used to control movements along any number of coordinates. As indicated by $O_M$ and $t_o$, applied to circuit A, it is possible to use the system of FIGURE 2 for three or more coordinates without materially increasing the amount of control circuitry required.

This is achieved by only occasionally opening and closing the control circuit. What is done is, basically, the taking of a coordinate sample from the control magnitude, which sample is quickly compared, the result is processed and a signal corresponding to the deviation is emitted, whereupon the control circuit is again opened, the measuring system and positioning member pertaining to the particular coordinate (for instance, the photoelectric scanning device $N_x$ and the motor $M_x$ insofar as the $x$ coordinate is concerned) being disconnected from the control circuit. After a certain time, the control circuit is agin activated, this time with the incorporation of the measuring system and positioning member pertaining to another coordinate, and another coordinate sample is taken, compared, and the appropriate deviation signal obtained. This process is repeated, depending on the number of coordinates to be considered. Thus, it is no longer necessary—as was the case heretofore—to use a separate electronic control circuit for each coordinate, so that if, for instance, seven coordinates have to be considered, it is no longer necessary to provide seven separate control circuits. Instead, only one control circuit is used, complemented according to the number of coordinates.

The system shown in FIGURE 2 can also be modified in such a manner that the measurement is taken with respect to the origin $N_a$ of the machine. Such an arrangement would comprise solely a reader L and the converter $SP/PP$ at whose output there would appear values $X_z$, $Y_z$, which are of interest only insofar as their amplitude is concerned. The algebraic sign of such system would, in contradistinction to the complete system of FIGURE 2 which allows the measurement to be taken with respect to the zero point $N_r$ of the work piece, always be positive. The coordinate conversion device KU consisting of the AND and OR circuits and the adder/subtractor would be eliminated inasmuch as the converter $SP/PP$ itself would put out the nominal positions directly.

The storage registers $X_oS$, $Y_oS$ of FIGURE 2 can be electronic memory circuits or mechanical switches. If the coded measuring scales $L_x$, $L_y$, have normal decade numbers which can be read off visually, it is expedient to use mechanical manually settable storage devices because the values stored therein will not be lost if, under certain circumstances, the power supply for the entire system fails. Upon the restoration of power, the values $X_o$, $Y_o$, of the zero point $N_r$ will remain, unchanged, at the outputs of the storage registers $X_0S$, $Y_0S$.

It is also possible to dispense with the storage registers $S_x$, $S_y$, shown in FIGURE 2, if the by-pass circuit, shown in dashed lines, is provided. The output of the comparison circuit SJ is connected directly to a single digital analog converter DA. This converter is connected, via a switching circuit U, during the time intervals $t_{xu}$, $t_{yu}=L$ to the positioning motors $M_x$, $M_y$, respectively. The time relationship of these clock pulses $t_{xu}$, $t_{yu}$ with respect to the other clock pulses is also shown in FIGURE 4. As shown in FIGURE 2, the control deviation appearing at the output of the comparison circuit SJ acts directly on the converter DA, so as to correspond with the measured values appearing at the circuit A during the time intervals $t_x$, $t_y=L$. Inasmuch as there are no storage registers $S_x$, $S_y$, the selected sampling frequency has to be relatively high so that the particular positioning motor which is in circuit will reach the average rotational speed which corresponds approximately to that which would be reached if the motor were continuously connected to the control circuit.

It sometimes happens that the work piece being worked is to be provided with bores for which no provision has been made on the punched tape. The arrangement according to the present invention takes this requirement into consideration by providing simple circuitry which will allow such additional bores to be provided. This can be done by means of the components identified as "Manual Control". The coordinates defining the position of the additional hole are applied, in coded form, to the leads $X_p$, $Y_p$, shown in FIGURE 2. The values of these coordinates can be produced, for example, by means of a decade switch which has a binary output.

When the control system is to operate in response to manual operation then the signal at "Punched Tape" does not equal L, as was the case for automatic operation, but 0, whereas there will be a signal=L at "Manual". The values $X_p$, $Y_p$, are applied to the AND circuits &$_7$, &$_8$, to which the clock pulses "Manual"=L are likewise applied. These two AND circuits are also controlled by the clock pulses $t_x$, $t_y$, which alternate with each other, as shown in FIGURE 4. The values $X_p$, $Y_p$, are thus passed through the AND circuits &$_7$, &$_8$, alternately in synchronism with clock pulses $t_x$, $t_y$. Accordingly, the values $X_v$ and $Y_v$ will appear alternately at the output of the OR circuit $v_2$. The coordinates $V_{xp}$, $V_{yp}$, which represent the algebraic sign of the $x$ and $y$ coordinates of the point at which the additional hole is to be drilled, are likewise fed into the circuit, and are applied to AND circuits &$_3$, &$_4$, both of which are likewise controlled by the clock pulses $t_x$, $t_y$, as well as subjected to the "Manual" signal=L. The algebraic sign command signal $V_x$, $V_y$, will then appear at the output of OR circuit $v_3$, in synchronism with the clock pulses $t_x=L$, $t_y=L$. These values will be either L or 0, depending on the algebraic sign.

If the machine tool is one which allows any desired number of coordinates over 10 m., and if the resolution is to be 10 μm., the origin storage registers $X_0S$, $Y_0S$ have to be so arranged as to be able to store values having a 20 bit width. This ability of the storage registers to store multiple bit values is indicated by the black triangles. The AND and OR circuits of the coordinate conversion device KU have to be similarly arranged; this is indicated, in the case of AND circuits &$_5$ through &$_{10}$ and OR circuits $v_1$, $v_2$, by the black triangles. Furthermore, the adder/subtractor circuit SD, the logic scanning circuit A, the comparison circuit SJ, and the storage registers $S_x$, $S_y$, have to be able to accept and process binary numbers having a width of 20 bits, as is represented by the respective black triangles.

FIGURE 5 is a schematic showing of a system in which a single control arrangement is provided for three coordinates. Again, the work piece supporting table of the machine tool is shown at T, this table being movable relative to the machine frame B' along the $x$, $y$, and $z$ coordinates by means of positioning motors $M_x$, $M_y$, $M_z$, acting via spindles P. The absolute zero point or origin of the machine is shown at $N_a$. The work piece W' is suitably clamped on the table T, at any point thereon. The work piece is provided with a mark $N_r$ which is to be referenced with respect to the origin $N_a$. This is accomplished by means of photosensitive scanning devices $N_x$, $N_y$, $N_z$, which, as in the above-described embodiment, are mounted for movement with the table T relative to coded measuring scales, the scales pertaining to the coordinates $x$ and $y$ being indicated at $L_x$ and $L_y$. The scale pertaining to the $z$ coordinate is not illustrated inasmuch as it extends in a plane perpendicular to that of the drawing. The start of these scales, which are suitably fixed to the machine frame B', coincides with the origin $N_a$. The outputs of the scanning devices $N_x$, $N_y$, $N_z$, yield values which can be used for forming the nominal value.

The control circuitry associated with the system shown in FIGURE 5 is similar to that described above in connection with FIGURE 2, except that it includes the storage register $S_z$ and the digital analog converter $DA_z$ which may, however, be by-passed by the single digital analog converter DA and the switching circuit U. The nominal position generator is indicated by S so that, at any one time, digital values pertaining to any one of the three coordinates may be applied to the comparison circuit SJ. It will be remembered that the nominal position generator, described in connection with FIGURE 2, is so arranged that the computation pertaining to the different coordinates can be carried out sequentially with such rapidity that the individual positioning motors $M_x$, $M_y$, $M_z$, will not be affected by the fact that they are being controlled not continuously but only throughout discrete time intervals. There will, of course, be means for generating not only the clock pulses $t_x$, $t_y$; $t_{xw}$, $t_{yw}$; $t_{xu}$, $t_{yu}$, but also clock pulses $t_z$, $t_{zw}$, and $t_{zu}$, the time relationship between these pulses being shown in FIGURE 6.

The circuit shown in FIGURE 5 also differs from that of FIGURE 2 in that the circuits A, S, SJ, $S_y$, $S_x$, $S_z$, instead of accepting and processing multiple bit binary numbers, accept and process multiple-position digital numbers in parallel form, each circuit thus comprising a plurality of individual cells or elements corresponding in number to the number of positions involved. This is shown by the black triangles appearing in the lower right-hand, instead of the left-hand, corners.

The arrangement of FIGURE 5 is not limited to control along three coordinates, as indicated by a value $N_M$ fed into circuit A and the fact that the nominal position generator S may also take the coordinate $n$ into consideration. Of course, additional clock pulses $t_n$, $t_{nw}$, and $t_{nu}$, will have to be provided.

It will be understood that the above description of the present invention is susceptible to various modifications, changes, and adaptations, and the same are intended to be comprehended within the meaning and range of equivalents of the appended claims.

What is claimed is:

1. For use with a record carrier carrying a program in the form of digital position values which are referenced with respect to a point of a work piece which point constitutes a relative origin, a controlled arrangement comprising, in combination:
    (a) a machine tool having a component which is movable relative to a point of the machine tool which last-mentioned point constitutes an absolute origin;
    (b) a position control system for controlling the movement of said component with respect to said absolute origin; and
    (c) means for algebraically adding to the position values of programmed points carried by the record carrier the digital difference between the position of the relative origin of the work piece and the position of said absolute origin of said machine tool thereby to form digital desired position values for said control system.

2. A controlled arrangement as defined in claim 1 wherein said adding means include means for forming a value derived from the coordinates of the position of said absolute zero point of the machine tool, the coordinates of the position of said relative origin point of the work piece, and the algebraic signs of the coordinates of the programmed point relative to said relative origin point of the work piece.

3. A controlled arrangement as defined in claim 2, further including means connected to the output of said adding means for cyclically scanning the data pertaining to each respective coordinate.

4. A controlled arrangement as defined in claim 3 wherein said control system includes a common comparison circuit connected to said adding means for comparing the actual and nominal positions in each coordinate and a plurality of measuring and positioning devices, corresponding in number to the number of coordinates.

5. A controlled arrangement as defined in claim 4 wherein said control system includes a logical circuit containing the actual value of the position of said movable component; means for applying to said logical circuit a plurality of clock pulse trains corresponding in number to the number of coordinates; and said comparison circuit being connected to the output of said logical circuit.

6. A controlled arrangement as defined in claim 4 wherein said system includes a coordinate conversion circuit; means for applying to said conversion circuit a plurality of clock pulse trains corresponding in number to the number of coordinates; means for feeding the coordinates of the relative origin point of the work piece into said conversion circuit; and means for feeding the coordinates of the programmed point, including the algebraic signs thereof, into said conversion circuit.

7. A controlled arrangement as defined in claim 6 wherein said system further includes decade switch means for manually feeding the coordinates of an additional programmed point into said conversion circuit.

8. A controlled arrangement as defined in claim 6 wherein said system further includes an adder/subtractor circuit connected to the output of said conversion circuit, the output of said adder/subtractor being connected to the input of said comparison circuit.

9. A controlled arrangement as defined in claim 8 wherein said system further includes, for each coordinate, a storage device which is subjected to a clock pulse train pertaining to the respective coordinate and which stores the deviation; and, for each coordinate, a digital analog converter connected to the output of the respective storage device.

10. A controlled arrangement as defined in claim 8 wherein said system further includes a single digital analog converter whose input is connected to the output of said comparison circuit; and a switching circuit connected to the output of said digital analog converter, said switching circuit being subjected to a plurality of clock pulse trains corresponding in number to the number of coordinates.

11. A controlled arrangement as defined in claim 10 wherein said switching circuit comprises electronic means for accepting and processing binary numbers having a given bit width.

12. A controlled arrangement as defined in claim 10 wherein said switching circuit comprises electronic means for accepting and processing multiple-position digital numbers in parallel form.

13. For use with a record carrier carrying a program in the form of digital position values which are referenced with respect to a point of a work piece which point constitutes a relative origin, a controlled arrangement comprising, in combination:

(a) a machine tool having a component which is movable relative to a point of the machine tool which last-mentioned point constitutes an absolute origin;

(b) a plurality of moving means connected to said component each being operative for moving said component in the direction of a particular coordinate;

(c) a position control system for controlling the movement of said component, under the influence of each of said moving means, with respect to said absolute origin; and (d) means for algebraically adding to the position values of programmed points carried by the record carrier the digital difference between the position of the relative origin of the work piece and the position of said absolute original of said machine tool thereby to form digital desired position values for said control system.

14. A controlled arrangement as defined in claim 13 wherein said position control system comprises a single electronic control circuit connectable to each of said plurality of moving means; and means for applying to said control system a plurality of clock pulse trains corresponding in number to the number of coordinates and for also applying to each moving means the clock pulse train pertaining to the particular coordinate along which such moving means moves said movable component, whereby the single electronic control circuit is used sequentially for each of said moving means.

15. A controlled arrangement as defined in claim 14 wherein said electronic control circuit comprises a plurality of storage devices each pertaining to a respective coordinate for storing therein the position of the relative origin point of the work piece with respect to the absolute origin point of the machine tool.

16. A controlled arrangement as defined in claim 15 wherein said electronic control circuit further comprises a coordinate converter circuit having a plurality of logic circuits for receiving the plurality of clock pulse trains, the output of said storage devices, and outside command signals representing the position of a programmed point at which the machine tool is to act on the work piece.

17. A controlled arrangement as defined in claim 16, further comprising command signal generating means responsive to signals carried by a record carrier, said command signal generating means being connected to said converter circuit.

18. A controlled arrangement as defined in claim 16, further comprising a manually settable command device connected to said converter circuit for producing said outside command signals.

19. A controlled arrangement as defined in claim 16 wherein said electronic control circuit further comprises an adder/subtractor circuit connected to the output of said coordinate converter circuit.

20. A controlled arrangement as defined in claim 19 wherein said electronic control circuit further comprises means for determining the coordinates of the actual position of said movable member; a logic circuit for receiving the plurality of clock pulse trains and the output of said determining means; and a comparison circuit for receiving the output of said last-mentioned logic circuit and the output of said adder/subtractor circuit, the output of said comparison circuit being connected to each of said moving means.

21. A controlled arrangement as defined in claim 20 wherein the output of said comparison circuit is connected to said moving means through the intermediary of a digital analog converter and a switching circuit, the latter being subjected to said plurality of clock pulse trains for connecting the output of said electronic control circuit to said moving means in synchronism with the operation of said single electronic circuit.

(References on following page)

References Cited by the Examiner

UNITED STATES PATENTS

| | | | |
|---|---|---|---|
| 2,817,775 | 12/1957 | Rosenberg et al. | 235—151 |
| 2,853,664 | 9/1958 | Towns et al. | 235—151 |
| 2,913,648 | 11/1959 | Brouwer | 318—162 |
| 2,996,348 | 8/1961 | Rosenberg | 318—162 |
| 2,997,638 | 8/1961 | Brittain | 318—162 |
| 3,011,113 | 11/1961 | Jeru et al. | 318—162 |
| 3,069,608 | 12/1962 | Forrester et al. | 235—151 |
| 3,093,781 | 6/1963 | Anke et al. | 235—151 |
| 3,099,777 | 7/1963 | Davis | 235—151 |
| 3,099,781 | 7/1963 | Herchenroeder | 235—151 |
| 3,134,064 | 5/1964 | Narbro | 235—151 |

MALCOLM A. MORRISON, *Primary Examiner.*

C. L. WHITHAM, I. KESCHNER, *Assistant Examiners.*